(12) United States Patent
Melkote Krishnaprasad et al.

(10) Patent No.: US 11,625,806 B2
(45) Date of Patent: Apr. 11, 2023

(54) METHODS AND APPARATUS FOR STANDARDIZED APIS FOR SPLIT RENDERING

(71) Applicant: QUALCOMM Incorporated, San Diego, CA (US)

(72) Inventors: Vinay Melkote Krishnaprasad, Bangalore (IN); Ajit Venkat Rao, Bangalore (IN); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 16/741,554

(22) Filed: Jan. 13, 2020

(65) Prior Publication Data
US 2020/0234395 A1    Jul. 23, 2020

(30) Foreign Application Priority Data
Jan. 23, 2019    (IN) .............................. 201941002809

(51) Int. Cl.
*G06T 1/20* (2006.01)
*H04L 67/10* (2022.01)
*G06T 19/00* (2011.01)

(52) U.S. Cl.
CPC .............. *G06T 1/20* (2013.01); *G06T 19/006* (2013.01); *H04L 67/10* (2013.01)

(58) Field of Classification Search
CPC .......... G06T 1/20; G06T 19/006; H04L 67/10
See application file for complete search history.

(56) References Cited

U.S. PATENT DOCUMENTS 5,457,797 A * 10/1995 Butterworth .......... G06F 9/5027
719/315
5,826,085 A * 10/1998 Bennett ................... G06F 9/465
719/316

(Continued)

OTHER PUBLICATIONS

Ditze M, et al., "Workload Balancing in Distributed Virtual Reality Environments," 1st International Workshop on Real-time Lans in the Internet Age, Vienna, Austria, Jun. 18, 2002 (Jun. 18, 2002), pp. 71-74, XP002636180, the whole document.

(Continued)

*Primary Examiner* — Charles L Beard
(74) *Attorney, Agent, or Firm* — Procopio, Cory, Hargreaves & Savitch LLP

(57) ABSTRACT

Aspects presented herein relate to methods and apparatus for graphics processing. Aspects presented herein can determine at least one split API for a user device and a server. Further, aspects presented herein can establish a communication interface between the user device and the server based on the split API. Additionally, aspects presented herein can communicate between the user device and the server based on the communication interface and the split API. Some aspects presented herein can implement the at least one split API on at least one of the user device or the server. Aspects presented herein can also divide at least one application workload between the user device and the server based on the at least one split API. Moreover, aspects presented herein can encode or decode application information at the user device or the server.

31 Claims, 9 Drawing Sheets

(56) References Cited

U.S. PATENT DOCUMENTS

| | | | |
|---|---|---|---|
| 6,606,660 B1* | 8/2003 | Bowman-Amuah | H04L 65/762 709/227 |
| 6,615,199 B1* | 9/2003 | Bowman-Amuah | G06F 9/449 706/50 |
| 6,615,253 B1* | 9/2003 | Bowman-Amuah | G06F 16/9574 709/219 |
| 6,625,226 B1* | 9/2003 | Gersho | G10L 19/24 704/E19.004 |
| 6,640,238 B1* | 10/2003 | Bowman-Amuah | H04L 67/568 709/224 |
| 6,640,244 B1* | 10/2003 | Bowman-Amuah | G06F 9/466 707/999.01 |
| 6,640,249 B1* | 10/2003 | Bowman-Amuah | G06F 8/36 709/228 |
| 6,681,251 B1* | 1/2004 | Leymann | H04L 67/1001 709/228 |
| 6,715,145 B1* | 3/2004 | Bowman-Amuah | G06F 8/20 718/100 |
| 6,721,952 B1* | 4/2004 | Guedalia | H04N 21/234318 725/38 |
| 6,742,015 B1* | 5/2004 | Bowman-Amuah | G06F 8/20 718/100 |
| 6,842,906 B1* | 1/2005 | Bowman-Amuah | G06F 9/465 719/330 |
| 7,082,474 B1* | 7/2006 | Hubbard | G06F 9/5072 709/224 |
| 7,139,821 B1* | 11/2006 | Shah | G06F 8/61 709/224 |
| 7,289,964 B1* | 10/2007 | Bowman-Amuah | G06F 9/5038 705/1.1 |
| 7,428,728 B2* | 9/2008 | Tewksbary | G06F 8/41 717/140 |
| 7,725,531 B1* | 5/2010 | Sood | G06F 9/5022 709/227 |
| 7,810,105 B2* | 10/2010 | Prabandham | G06F 9/445 719/328 |
| RE42,153 E* | 2/2011 | Hubbard | H04L 43/50 709/224 |
| 8,239,538 B2* | 8/2012 | Zhang | H04L 67/1001 718/1 |
| 8,601,534 B2* | 12/2013 | Schiffman | G06F 9/5011 726/1 |
| 8,935,317 B2* | 1/2015 | Jain | G06F 9/5094 718/1 |
| 9,043,421 B1* | 5/2015 | Coon | H04L 43/16 709/200 |
| 9,058,336 B1* | 6/2015 | Barker, Jr. | H04L 41/0896 |
| 9,064,326 B1* | 6/2015 | Loxam | G06V 20/20 |
| 9,205,886 B1* | 12/2015 | Hickman | G05D 1/0274 |
| 9,398,069 B2* | 7/2016 | Bishop | H04L 67/303 |
| 9,578,088 B2* | 2/2017 | Nickolov | H04L 67/1031 |
| 9,858,720 B2* | 1/2018 | da Veiga | G06F 3/04815 |
| 10,015,504 B2* | 7/2018 | Wei | H04N 19/12 |
| 10,019,298 B2* | 7/2018 | Yim | G06F 8/41 |
| 10,068,553 B2* | 9/2018 | Hicks | G06T 19/006 |
| 10,109,030 B1* | 10/2018 | Sun | G06T 1/20 |
| 10,275,543 B1* | 4/2019 | Edsinger | G06F 30/00 |
| 10,306,180 B2* | 5/2019 | McLoughlin | H04N 13/194 |
| 10,382,518 B2* | 8/2019 | Neagu | G06F 9/451 |
| 10,402,227 B1* | 9/2019 | Kinney, Jr. | G06F 9/5011 |
| 10,419,305 B2* | 9/2019 | Deshpande | H04L 47/70 |
| 10,446,119 B2* | 10/2019 | Lakshmikantha | H04N 19/436 |
| 10,482,677 B1* | 11/2019 | Iyer | G06F 17/16 |
| 10,573,057 B1* | 2/2020 | Dixit | G06F 16/335 |
| 10,659,523 B1* | 5/2020 | Joseph | H04L 67/10 |
| 10,671,163 B2* | 6/2020 | Kiemele | G06T 19/006 |
| 10,728,169 B1* | 7/2020 | McClenahan | H04L 41/082 |
| 10,812,774 B2* | 10/2020 | Gopalakrishnan | H04N 13/161 |
| 10,835,827 B1* | 11/2020 | Pather | A63F 13/655 |
| 10,854,012 B1* | 12/2020 | Iyer | G02B 27/0093 |
| 10,877,796 B1* | 12/2020 | Kinney, Jr. | G06F 9/4843 |
| 10,938,960 B2* | 3/2021 | Wason | G06F 9/548 |
| 10,953,327 B2* | 3/2021 | Fersch | H04L 67/131 |
| 10,962,780 B2* | 3/2021 | Ambrus | G06T 11/60 |
| 10,977,089 B2* | 4/2021 | Koster | G06F 9/5066 |
| 11,017,322 B1* | 5/2021 | Du | G06N 20/00 |
| 11,019,031 B1* | 5/2021 | Harvell | H04L 63/1425 |
| 11,074,526 B1* | 7/2021 | Gormley | G06Q 50/30 |
| 11,144,117 B1* | 10/2021 | Choudhuri | G06N 20/00 |
| 11,153,173 B1* | 10/2021 | Rebeja | H04L 41/0806 |
| 11,218,553 B2* | 1/2022 | Filippou | H04L 67/12 |
| 11,281,498 B1* | 3/2022 | Kinney, Jr. | G06F 9/4881 |
| 11,321,928 B2* | 5/2022 | Melkote Krishnaprasad | G06T 1/20 |
| 11,412,310 B2* | 8/2022 | Stockhammer | H04N 21/6437 |
| 2002/0143947 A1* | 10/2002 | Ishmael, Jr. | G06F 9/505 709/225 |
| 2002/0174010 A1* | 11/2002 | Rice | G06F 16/182 705/14.67 |
| 2003/0009571 A1* | 1/2003 | Bavadekar | H04L 47/18 709/230 |
| 2003/0028514 A1* | 2/2003 | Lord | H04L 67/566 |
| 2003/0078946 A1* | 4/2003 | Costello | H04L 67/564 |
| 2005/0050202 A1* | 3/2005 | Aiken, Jr. | H04L 27/02 709/227 |
| 2007/0130570 A1* | 6/2007 | Paniscotti | G06F 9/541 719/311 |
| 2008/0196025 A1* | 8/2008 | Meijer | G06F 8/45 717/177 |
| 2008/0215583 A1* | 9/2008 | Gunawardena | G06F 16/9535 |
| 2009/0232222 A1* | 9/2009 | Stockhammer | H04N 19/44 375/240.24 |
| 2010/0131590 A1* | 5/2010 | Coleman | G06F 9/5044 709/201 |
| 2010/0149195 A1* | 6/2010 | Fernando | G06T 1/20 345/506 |
| 2010/0223385 A1* | 9/2010 | Gulley | H04L 67/60 718/104 |
| 2011/0004916 A1* | 1/2011 | Schiffman | G06F 9/5011 726/1 |
| 2012/0084184 A1* | 4/2012 | Raleigh | H04W 48/16 709/224 |
| 2012/0306850 A1* | 12/2012 | Balan | G06F 3/0304 345/419 |
| 2012/0317488 A1* | 12/2012 | Rudolph | G06F 9/542 715/733 |
| 2012/0317504 A1* | 12/2012 | Patel | G06F 9/451 715/762 |
| 2013/0159074 A1* | 6/2013 | Chavan | G06F 3/048 709/206 |
| 2013/0159433 A1* | 6/2013 | Chavan | G06Q 30/0241 709/206 |
| 2013/0290513 A1* | 10/2013 | Shikari | H04L 67/1008 709/224 |
| 2014/0020072 A1* | 1/2014 | Thomas | H04L 67/10 726/7 |
| 2014/0089260 A1* | 3/2014 | Amrhein | G06F 9/4856 707/615 |
| 2014/0109041 A1* | 4/2014 | Yunten | H04L 67/10 717/109 |
| 2014/0120887 A1* | 5/2014 | Huang | H04L 67/131 455/414.1 |
| 2014/0143313 A1* | 5/2014 | Tanaka | G06F 9/505 709/203 |
| 2014/0225924 A1* | 8/2014 | Loxam | G09G 5/14 345/633 |
| 2014/0253743 A1* | 9/2014 | Loxam | H04N 5/272 348/207.1 |
| 2014/0358997 A1* | 12/2014 | Boulkenafed | H04L 12/18 709/203 |
| 2014/0372624 A1* | 12/2014 | Wang | H04L 65/75 709/231 |
| 2015/0006620 A1* | 1/2015 | Joseph | H04L 67/10 709/203 |

(56) References Cited

U.S. PATENT DOCUMENTS

| | | | |
|---|---|---|---|
| 2015/0007619 A1* | 1/2015 | Finney | G07F 17/12 |
| | | | 70/264 |
| 2015/0062120 A1* | 3/2015 | Reisner-Kollmann | |
| | | | G06T 19/006 |
| | | | 345/419 |
| 2015/0095360 A1* | 4/2015 | Vrcelj | G06V 10/757 |
| | | | 707/758 |
| 2015/0096011 A1* | 4/2015 | Watt | G06F 3/0647 |
| | | | 726/15 |
| 2015/0106091 A1* | 4/2015 | Wetjen | G10L 15/26 |
| | | | 704/235 |
| 2015/0127365 A1* | 5/2015 | Rizvi | G06V 40/28 |
| | | | 705/2 |
| 2015/0156131 A1* | 6/2015 | Pomerantz | H04L 67/10 |
| | | | 709/226 |
| 2015/0182857 A1* | 7/2015 | Kuo | H04N 21/8146 |
| | | | 345/420 |
| 2015/0201417 A1* | 7/2015 | Raleigh | H04L 67/34 |
| | | | 370/329 |
| 2015/0213325 A1* | 7/2015 | Krishnamoorthi | G06V 10/772 |
| | | | 382/190 |
| 2015/0295844 A1* | 10/2015 | Perreira | H04L 67/10 |
| | | | 709/226 |
| 2015/0339159 A1* | 11/2015 | Gupta | G06F 9/5094 |
| | | | 718/105 |
| 2015/0373093 A1* | 12/2015 | Ashok | H04L 67/1008 |
| | | | 709/223 |
| 2015/0378765 A1* | 12/2015 | Singh | G06F 9/45558 |
| | | | 718/1 |
| 2015/0379416 A1* | 12/2015 | Holtzman | G06Q 30/0278 |
| | | | 706/11 |
| 2016/0004575 A1* | 1/2016 | Fink | G06F 9/541 |
| | | | 719/328 |
| 2016/0006795 A1* | 1/2016 | Yunten | G06F 8/34 |
| | | | 709/203 |
| 2016/0011900 A1* | 1/2016 | Reddy | H04L 43/065 |
| | | | 718/1 |
| 2016/0023351 A1* | 1/2016 | Kuffner | B25J 9/0084 |
| | | | 901/47 |
| 2016/0078361 A1* | 3/2016 | Brueckner | H04L 67/10 |
| | | | 706/12 |
| 2016/0101356 A1* | 4/2016 | Kuo | H04N 21/44 |
| | | | 345/420 |
| 2016/0260261 A1* | 9/2016 | Hsu | A61F 9/06 |
| 2016/0277511 A1* | 9/2016 | Fang | H04L 43/0876 |
| 2016/0300388 A1* | 10/2016 | Stafford | A63F 13/69 |
| 2016/0323063 A1* | 11/2016 | Mandyam | H04L 1/0041 |
| 2016/0337442 A1* | 11/2016 | Idicula | H04L 12/40143 |
| 2016/0342445 A1* | 11/2016 | van der Lugt | G06F 8/456 |
| 2016/0364115 A1* | 12/2016 | Joung | G06F 3/04842 |
| 2017/0004377 A1* | 1/2017 | Kim | G06T 19/20 |
| 2017/0115488 A1* | 4/2017 | Ambrus | G02B 27/0172 |
| 2017/0162177 A1* | 6/2017 | Lebeck | G06F 3/14 |
| 2017/0178272 A1* | 6/2017 | Lashkari | G06T 1/20 |
| 2017/0242764 A1* | 8/2017 | Antony | G06F 11/2028 |
| 2017/0243403 A1* | 8/2017 | Daniels | G06T 19/20 |
| 2017/0263040 A1* | 9/2017 | Surazhsky | G09G 5/026 |
| 2017/0270077 A1* | 9/2017 | Morard | H04N 21/44012 |
| 2017/0270641 A1* | 9/2017 | Kim | G06T 3/4092 |
| 2017/0289240 A1* | 10/2017 | Ghare | G06F 16/24568 |
| 2017/0359370 A1* | 12/2017 | Humphries | H04L 63/1416 |
| 2017/0371639 A1* | 12/2017 | Simek | G06F 8/656 |
| 2018/0007014 A1* | 1/2018 | Neal | H04L 9/0822 |
| 2018/0052723 A1* | 2/2018 | Yim | G06F 9/54 |
| 2018/0060505 A1* | 3/2018 | Gabriel | G06Q 20/0855 |
| 2018/0067736 A1* | 3/2018 | De Zaeytijd | G06F 8/65 |
| 2018/0103088 A1* | 4/2018 | Blai | H04L 67/10 |
| 2018/0150299 A1* | 5/2018 | Balle | H03M 7/3084 |
| 2018/0167268 A1* | 6/2018 | Liguori | G06F 9/445 |
| 2018/0167440 A1* | 6/2018 | Rybkin | H04L 67/5683 |
| 2018/0233119 A1* | 8/2018 | Patti | H04L 65/80 |
| 2018/0300098 A1* | 10/2018 | Vembar | G09G 5/363 |
| 2018/0308287 A1* | 10/2018 | Daniels | G06T 19/20 |
| 2018/0350151 A1* | 12/2018 | Manvel | G06T 19/20 |
| 2018/0357510 A1* | 12/2018 | Krishnamoorthi | G06V 10/757 |
| 2018/0357823 A1* | 12/2018 | Koniki | G09B 5/02 |
| 2019/0012826 A1* | 1/2019 | Melkote Krishnaprasad | |
| | | | G06T 7/50 |
| 2019/0025903 A1* | 1/2019 | Mehta | H04L 67/10 |
| 2019/0026936 A1* | 1/2019 | GorurSheshagiri | G06F 3/0304 |
| 2019/0037244 A1* | 1/2019 | Melkote Krishnaprasad | |
| | | | H04N 19/105 |
| 2019/0102922 A1* | 4/2019 | Gum | G01C 21/3697 |
| 2019/0104121 A1* | 4/2019 | Khandani | H04L 9/085 |
| 2019/0105568 A1* | 4/2019 | Platt | A63F 13/52 |
| 2019/0197364 A1* | 6/2019 | Cheng | G06F 16/113 |
| 2019/0200084 A1* | 6/2019 | Gilson | H04N 21/234327 |
| 2019/0205647 A1* | 7/2019 | Kumar | G06Q 10/06316 |
| 2019/0243920 A1* | 8/2019 | Pollock | H04L 67/133 |
| 2019/0243964 A1* | 8/2019 | Shukla | G06F 21/54 |
| 2019/0244267 A1* | 8/2019 | Rattner | G06N 20/00 |
| 2019/0270015 A1* | 9/2019 | Li | G06T 17/00 |
| 2019/0279407 A1* | 9/2019 | McHugh | G06F 3/011 |
| 2019/0333263 A1* | 10/2019 | Melkote Krishnaprasad | |
| | | | G06F 3/013 |
| 2019/0342632 A1* | 11/2019 | DeFaria | H04N 13/117 |
| 2019/0373395 A1* | 12/2019 | Sarkar | G06T 19/006 |
| 2019/0386889 A1* | 12/2019 | Noorshams | H04L 41/147 |
| 2020/0004600 A1* | 1/2020 | Acker | H04L 67/10 |
| 2020/0007659 A1* | 1/2020 | Wason | G06F 9/547 |
| 2020/0021505 A1* | 1/2020 | Vinnakota | H04L 45/20 |
| 2020/0045285 A1* | 2/2020 | Varerkar | H04N 19/597 |
| 2020/0059694 A1* | 2/2020 | Ju | H04N 13/156 |
| 2020/0077124 A1* | 3/2020 | Shi | H04N 21/6587 |
| 2020/0090407 A1* | 3/2020 | Miranda | G06T 7/33 |
| 2020/0092578 A1* | 3/2020 | Huang | G06T 3/0075 |
| 2020/0098186 A1* | 3/2020 | Xue | H04N 21/6587 |
| 2020/0099954 A1* | 3/2020 | Hemmer | H04N 19/186 |
| 2020/0104538 A1* | 4/2020 | Summers | G06F 21/606 |
| 2020/0134780 A1* | 4/2020 | Chapiro | G06T 19/003 |
| 2020/0136921 A1* | 4/2020 | Doshi | G06F 9/44594 |
| 2020/0154131 A1* | 5/2020 | Iyer | H04N 5/33 |
| 2020/0195728 A1* | 6/2020 | Fitzer | H04L 69/329 |
| 2020/0225737 A1* | 7/2020 | Limor | G06F 15/60 |
| 2020/0240788 A1* | 7/2020 | Iyer | G06F 3/011 |
| 2020/0241632 A1* | 7/2020 | Iyer | G06F 3/017 |
| 2020/0241634 A1* | 7/2020 | Iyer | H04N 19/17 |
| 2020/0242595 A1* | 7/2020 | Harrison | H04L 67/1097 |
| 2020/0250174 A1* | 8/2020 | Padmanabhan | H04L 67/10 |
| 2020/0322403 A1* | 10/2020 | Dvir | H04N 13/117 |
| 2020/0322649 A1* | 10/2020 | Melkote Krishnaprasad | |
| | | | H04N 21/439 |
| 2020/0326981 A1* | 10/2020 | Pfister | G06F 9/505 |
| 2020/0357165 A1* | 11/2020 | Dixit | G06T 19/006 |
| 2020/0364901 A1* | 11/2020 | Choudhuri | G06T 19/006 |
| 2020/0380719 A1* | 12/2020 | Iyer | G01C 21/3811 |
| 2020/0389515 A1* | 12/2020 | Han | H04W 4/24 |
| 2020/0394819 A1* | 12/2020 | Reddan | G01B 11/026 |
| 2020/0403868 A1* | 12/2020 | Punathil | H04L 41/0823 |
| 2020/0403935 A1* | 12/2020 | Yerli | H04L 47/82 |
| 2020/0404078 A1* | 12/2020 | Iyer | H04W 4/021 |
| 2020/0404604 A1* | 12/2020 | Han | H04W 56/004 |
| 2021/0012113 A1* | 1/2021 | Petill | G06F 1/1694 |
| 2021/0014198 A1* | 1/2021 | Amoudi | H04L 63/0236 |
| 2021/0036750 A1* | 2/2021 | Chen | H04L 1/1861 |
| 2021/0036821 A1* | 2/2021 | Chen | H04L 5/0094 |
| 2021/0037250 A1* | 2/2021 | Makar | H04N 19/107 |
| 2021/0056762 A1* | 2/2021 | Robbe | G06F 16/2282 |
| 2021/0067538 A1* | 3/2021 | Mishra | H04L 63/1433 |
| 2021/0090315 A1* | 3/2021 | Gladkov | G06F 3/013 |
| 2021/0104090 A1* | 4/2021 | Hur | H04N 19/597 |
| 2021/0136397 A1* | 5/2021 | Lakshmikantha | H04L 43/08 |
| 2021/0158620 A1* | 5/2021 | Saraf | H04W 48/08 |
| 2021/0166487 A1* | 6/2021 | Wren | G06T 19/006 |
| 2021/0173661 A1* | 6/2021 | Cheng | G06F 21/64 |
| 2021/0174596 A1* | 6/2021 | Zhang | G06F 3/04817 |
| 2021/0176063 A1* | 6/2021 | Liu | G06F 21/575 |
| 2021/0182639 A1* | 6/2021 | Brent | G06K 19/06046 |
| 2021/0185294 A1* | 6/2021 | Malaika | G06F 3/0346 |
| 2021/0192847 A1* | 6/2021 | Nagaraja | G06T 19/006 |
| 2021/0201530 A1* | 7/2021 | Cowburn | G06T 19/006 |
| 2021/0208919 A1* | 7/2021 | Souhrada | H04L 47/76 |

(56) References Cited

U.S. PATENT DOCUMENTS

| | | | |
|---|---|---|---|
| 2021/0215940 A1* | 7/2021 | Freese | G06T 7/90 |
| 2021/0240258 A1* | 8/2021 | Son | G02B 27/017 |
| 2021/0256768 A1* | 8/2021 | Zhao | G06F 9/547 |
| 2021/0263317 A1* | 8/2021 | Yaroshchuk | G06T 19/006 |
| 2021/0264685 A1* | 8/2021 | Velasquez | G06T 7/38 |
| 2021/0271513 A1* | 9/2021 | Tiwary | H04L 67/10 |
| 2021/0281638 A1* | 9/2021 | Vrcelj | H04L 43/0882 |
| 2021/0287321 A1* | 9/2021 | Gormley | G06Q 50/30 |
| 2021/0303327 A1* | 9/2021 | Vu | G06F 9/45558 |
| 2021/0304020 A1* | 9/2021 | Kaplan | G06F 9/541 |
| 2021/0312533 A1* | 10/2021 | Luo | G06Q 20/3267 |
| 2021/0312691 A1* | 10/2021 | Makar | G06T 9/00 |
| 2021/0312701 A1* | 10/2021 | Vrcelj | G06T 1/20 |
| 2021/0312704 A1* | 10/2021 | Garvey | G06T 7/60 |
| 2021/0337043 A1* | 10/2021 | Hall | H04L 67/59 |
| 2021/0350139 A1* | 11/2021 | Pardeshi | G06N 3/08 |
| 2021/0350550 A1* | 11/2021 | Stengel | G06V 40/19 |
| 2021/0358219 A1* | 11/2021 | Melkote Krishnaprasad | G06T 15/30 |
| 2021/0360330 A1* | 11/2021 | Stockhammer | H04N 21/6587 |
| 2022/0030062 A1* | 1/2022 | Jennings | H04L 69/16 |
| 2022/0053195 A1* | 2/2022 | Hurwitz | G06F 16/583 |
| 2022/0095355 A1* | 3/2022 | Kim | H04W 76/28 |
| 2022/0095360 A1* | 3/2022 | Kim | H04W 72/0446 |
| 2022/0100265 A1* | 3/2022 | Kies | G06F 3/0485 |
| 2022/0122326 A1* | 4/2022 | Reitmayr | H04N 23/698 |
| 2022/0172440 A1* | 6/2022 | Budagavi | H04N 21/6332 |
| 2022/0188964 A1* | 6/2022 | Hagland | H04N 21/226 |
| 2022/0189108 A1* | 6/2022 | Shandilya | G06T 7/73 |
| 2022/0206772 A1* | 6/2022 | Akiona | H04L 63/18 |
| 2022/0256359 A1* | 8/2022 | Awoniyi-Oteri | H04B 7/0608 |
| 2022/0256647 A1* | 8/2022 | Salmasi | H04L 67/04 |
| 2022/0284665 A1* | 9/2022 | Garvey | G06T 11/40 |
| 2022/0353732 A1* | 11/2022 | Filippou | H04W 28/0284 |
| 2022/0358730 A1* | 11/2022 | Otsuki | H04L 67/131 |
| 2022/0360645 A1* | 11/2022 | Badic | H04L 67/51 |
| 2022/0369000 A1* | 11/2022 | Bouazizi | H04N 21/816 |
| 2022/0387886 A1* | 12/2022 | Weising | A63F 13/53 |
| 2022/0414403 A1* | 12/2022 | Hlavac | G06F 18/22 |

OTHER PUBLICATIONS

International Search Report and Written Opinion—PCT/US2020/014455—ISA/EPO—dated May 15, 2020.

\* cited by examiner

METHODS AND APPARATUS FOR STANDARDIZED APIS FOR SPLIT RENDERING

CROSS REFERENCE TO RELATED APPLICATION(S)

This application claims the benefit of Indian Provisional Application No. 201941002809, entitled "METHODS AND APPARATUS FOR STANDARDIZED APIS FOR SPLIT RENDERING" and filed on Jan. 23, 2019, which is expressly incorporated by reference herein in its entirety.

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user device, a server, a central processing unit (CPU), a graphics processing unit (GPU), or any apparatus that can perform graphics processing. The apparatus can determine at least one split application program interface (API) for a user device and a server. Further, the apparatus can establish a communication interface between the user device and the server based on the at least one split API. In some aspects, the apparatus can implement the at least one split API on at least one of the user device or the server. The apparatus can also divide at least one application workload between the user device and the server based on the at least one split API. Moreover, the apparatus can encode or decode application information at the user device or the server. Additionally, the apparatus can communicate between the user device and the server based on the communication interface and the at least one split API.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
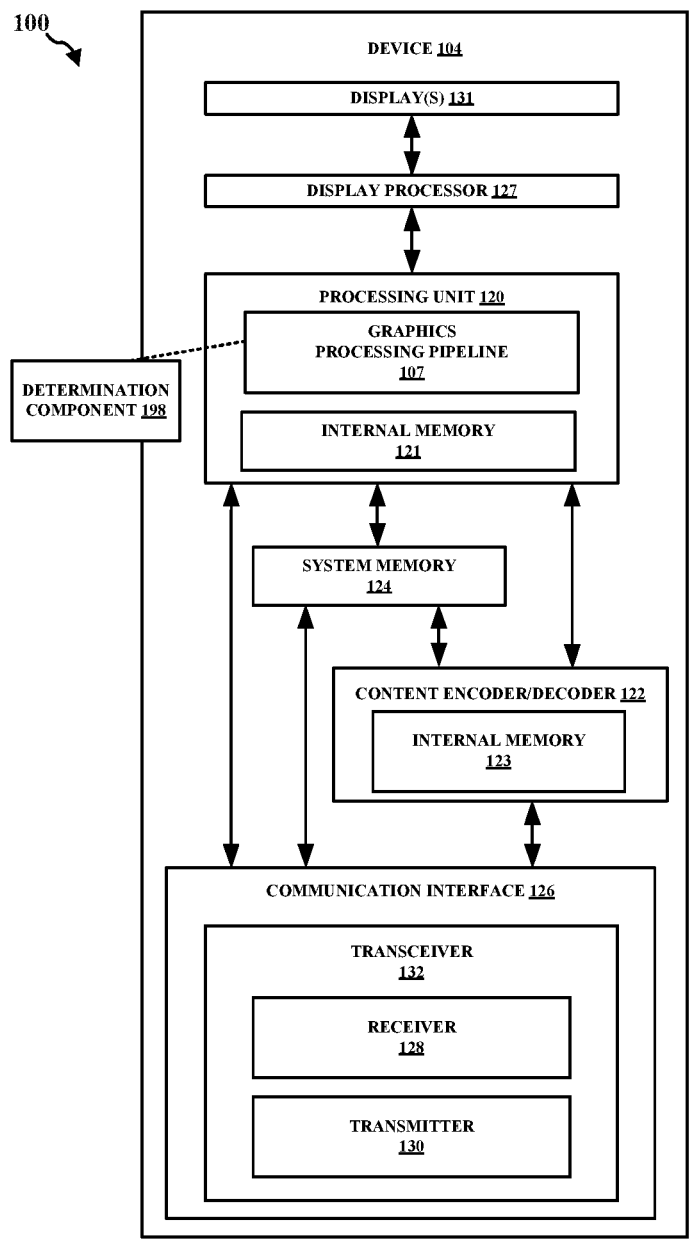
FIG. 1 is a block diagram that illustrates an example content generation system in accordance with one or more techniques of this disclosure.

In some instances, open extended reality (XR) may be utilized by different XR devices and applications to communicate with each other through standardized application program interfaces (APIs). However, some of the processes in open XR may assume that applications and XR runtimes are co-located, i.e., on same device. In the context of split XR, where the rendering load may be fully or partially offset to a remote server, standardized APIs may not exist. For instance, applications may need to be designed for an individual device, as applications within split XR may not be interoperable with any type of device. Aspects of the present disclosure include systems and methods that standardize APIs for split rendering. By doing so, aspects of the present can introduce an interoperability between applications and devices in an XR, augmented reality (AR), or virtual reality (VR) setting. Accordingly, different types of split rendering devices or applications can be interoperable with other split rendering devices or applications based on the API architectures of the present disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine at least one split application program interface (API) for a user device and a server. The determination component 198 can also be configured to establish a communication interface between the user device and the server based on the at least one split API. The determination component 198 can also be configured to implement the at least one split API on at least one of the user device or the server. The determination component 198 can also be configured to divide at least one application workload between the user device and the server based on the at least one split API. The determination component 198 can also be configured to encode or decode application information at the user device or the server. The determination component 198 can also be configured to communicate between the user device and the server based on the communication interface and the at least one split API.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
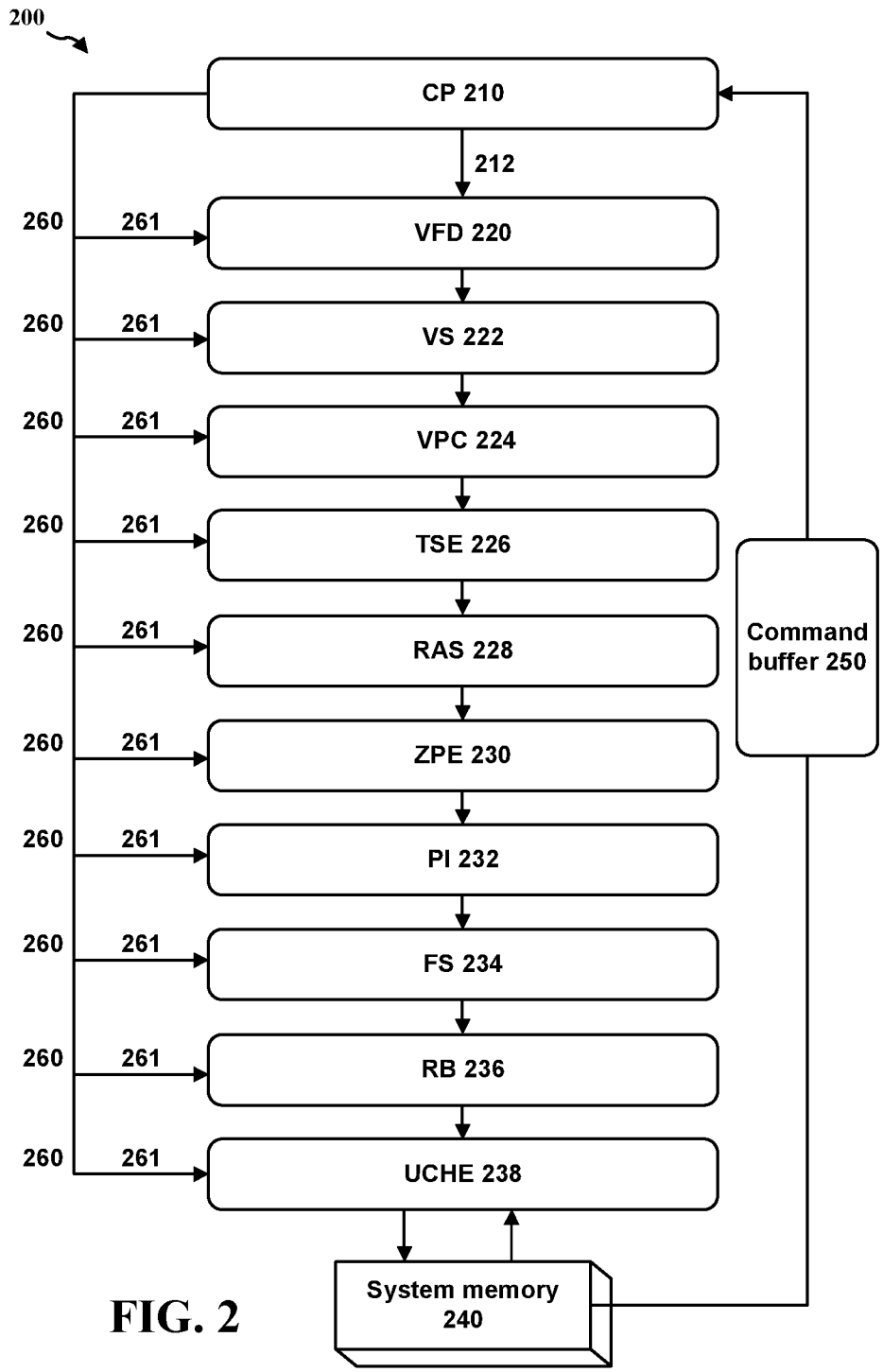
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, the rendering of an image or frame can be performed in multiple locations and/or on multiple devices, e.g., in order to divide the rendering workload between different devices. For example, the rendering workload can be split between a server and a user device. In some aspects, this process can be referred to as "split rendering." In some instances, split rendering can be a method for bringing content to user devices or head mounted displays (HMDs), where a portion of the computer or graphics processing can be performed outside of the user device or HMD, e.g., at a server.

Split rendering can be performed for a number of different types of applications, e.g., virtual reality (VR) applications, augmented reality (AR) applications, augmented virtuality (AV), and/or extended reality (XR) applications. In VR applications, the content displayed at the user device can correspond to rendered or animated content, e.g., content rendered at a server or user device. In AR or XR applications, a portion of the content displayed at the user device can correspond to real-world content, e.g., objects in the real world, and a portion of the content can be rendered or animated content.

Additionally, the rendered or animated content and real-world content can be displayed in an optical see-through or a video see-through device, such that the user can view real-world objects and rendered content simultaneously. In some aspects, XR content can refer to both VR and AR content. XR, VR, and AR applications can all involve a user viewing rendered content through a headset.

Split rendering can provide a high quality user experience in XR, AR or VR applications by splitting the computational workload between a client or user device, e.g., a HMD or headset, and a server. In some aspects, the user device and the server can be connected to each other via a low-latency communication link, e.g., 5G or Wi-Fi. Also, the server can be located close to the low-latency communication link in order to reduce latency. In some aspects, the server can be referred to as an edge server or a cloud server.

In some instances of XR, VR, and AR applications, a user device or headset can include a GPU or graphics processing device, which can perform the necessary computations or graphics processing for the rendered content. Utilizing split rendering can offload a significant portion of computations or graphics processing to a server. In these instances, the server can be any device that can perform some computations or graphics processing offloaded from the user device. For example, the server can be a cloud server, an edge server, a personal computer, a smart phone, or any appropriate device.

Open XR or OpenXR is an approach for different XR, AR, AV and/or VR devices and applications to communicate with one other. For instance, in the context of XR, AR, AV and/or VR applications, open XR can allow different devices and applications to communicate. This may allow application developers and device manufacturers to be largely agnostic of one another. For example, a game developer can develop an open XR compliant VR game, which can work with different VR headsets or devices that in turn have open XR compliant run times.

Figure 3:
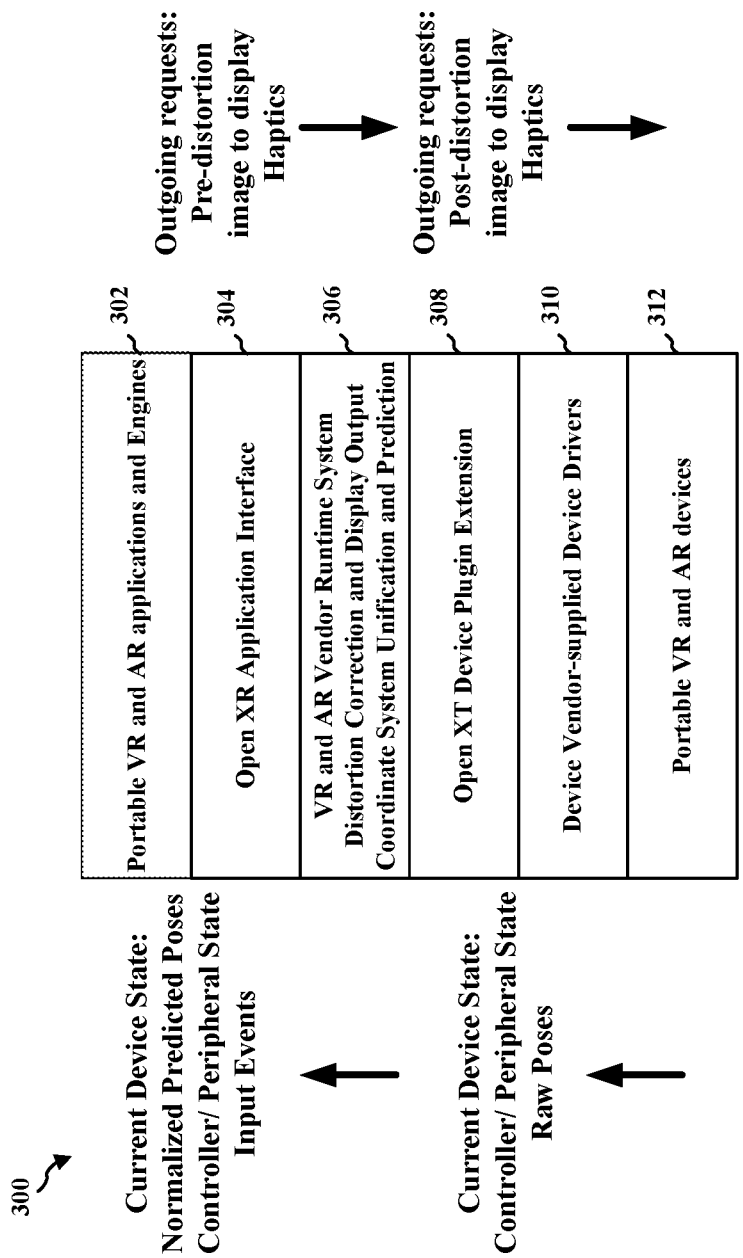
FIG. 3 illustrates an example flow diagram including an application interface.

FIG. 3 illustrates an example flow diagram 300. As shown in FIG. 3, diagram 300 is a diagram of open XR interfaces. More specifically, diagram 300 includes one or more steps or applications: portable VR and AR applications and engines step 302, an open XR application interface step 304, VR and AR vendor runtime system distortion correction and display output coordinate system unification and prediction step 306, open XR device plugin extension step 308, device vendor-supplied device drivers step 310, and portable VR and AR devices step 312.

FIG. 3 displays that the current device states can flow from the portable VR and AR devices step 312 to the portable VR and AR applications and engines step 302. As further displayed in FIG. 3, the current device states include a controller or peripheral state or raw poses. Also, the current device states include normalized predicated poses or input events. FIG. 3 also displays that the outgoing requests can flow from the portable VR and AR applications and engines step 302 to the portable VR and AR devices step 312. The outgoing requests can include pre-distortion image-to-display, haptics, or post-distortion image-to-display.

As indicated above, open XR or OpenXR may be an approach for different XR devices and applications to communicate with each other through standardized application program interfaces (APIs). APIs may run on both the server and the device. However, some of the processes in open XR may assume that applications and XR runtimes are co-located, i.e., on same device. In the context of split XR or SplitXR, where the rendering load may be fully or partially offset to a remote server, standardized APIs may not exist. For instance, applications may need to be designed for an individual device, as applications within split XR may not be interoperable with any type of device. Accordingly, there is a present need for split XR devices to be interoperable with different applications via API architectures.

Aspects of the present disclosure include systems and methods that standardize APIs for split rendering. By doing so, aspects of the present can introduce an interoperability between applications and devices in an XR, AR, or VR setting. So applications can be designed for any device that supports split XR, rather than merely designing an application for an individual device. Accordingly, different types of devices can be interoperable with other devices or applications based on the API architectures of the present disclosure. For instance, the present disclosure can include architecture that standardizes APIs, e.g., for split rendering.

The present disclosure can propose one or more API architectures that allow for a game developer to create a split XR experience while being agnostic to end devices or end device consumption of an application. For example, applications may not need to be designed for specific devices, as there can be interoperability with different devices. Additionally, the present disclosure can propose API architectures that allow for split XR applications to be agnostic to user devices or head-mounted display (HMD) device specifications. For instance, the present disclosure includes an approach to include open XR compliant applications and devices as a specialization of the proposed architecture.

Figure 4:
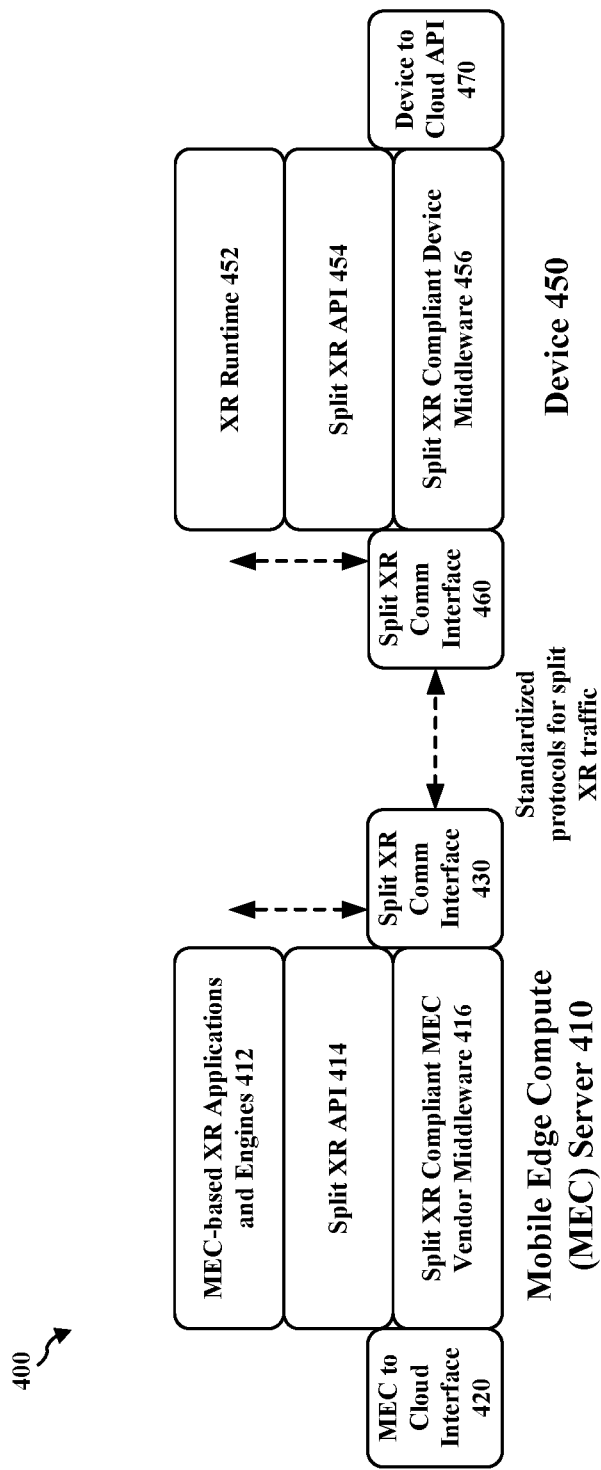
FIG. 4 illustrates an example architecture in accordance with one or more techniques of this disclosure.

FIG. 4 illustrates architecture 400 in accordance with one or more techniques of this disclosure. As shown in FIG. 4, architecture 400 is a proposed API architecture for split XR. As further shown in FIG. 4, architecture 400 includes a device 450 and a mobile edge compute (MEC) server 410. FIG. 4 also displays that standardized protocols for split XR traffic are communicated between the device 450 and the MEC server 410.

The MEC server 410 can include MEC-based XR applications and engines 412, split XR API 414, split XR compliant MEC vendor middleware 416, split XR communication interface 430, and/or MEC to cloud interface 420. The device 450 can include XR runtime 452, a split XR API 454, split XR compliant device middleware 456, a split XR communication interface 460, and/or a device to cloud interface 470. As shown in FIG. 4, the standardized protocols for split XR traffic can be communicated between split XR communication interface 430 and split XR communication interface 460.

In one aspect, a game or application may be deployed on an edge server, e.g., MEC server 410. The game may submit frames to the device runtime, e.g., XR runtime 452, through the split XR communication interface 430 on the MEC server 410. In some aspects, the underlying middleware at the edge server, e.g., middleware 416, can ensure implementation of a standardized communication stack to the device 450, as well as orchestrate game instances. The middleware 416 can encode frames or information, e.g., to a standard codec, and communicate this information to the middleware 456 on the device 450. The middleware 456 can decode this information from middleware 416. Also, the MEC-based XR applications and engines 412 can communicate with the middleware 416 via the split XR API 414. As shown in FIG. 4, middleware 416 can be split XR compliant.

Further, the XR device manufacturer may similarly implement a middleware, e.g., middleware 456, that receives and transmits split XR traffic through a standardized communication interface, e.g., communication interface 460. In some instances, such middleware may be provided by a chip manufacturer. Additionally, the XR runtime 452 can receive and transmit information to the server 410 through split XR APIs, e.g., split XR APIs 414 and 454. For example, the XR runtime 452 may transmit a stream of camera frames to the edge server to run object recognition.

In some instances, the middleware 416 on the server 410 can communicate with middleware 456 on the device 450, e.g., via the split XR communication interface 430 and split XR communication interface 460. Also, the XR runtime 452 can communicate with the middleware 456 via the split XR API 454. As such, the middleware 456 can provide information to the runtime 452. The middleware 456 can also be a proxy to the application or game, e.g., on the server 410.

Further, the middleware 456 can help ensure the runtime 452 is agnostic as to whether the application or game is running on the server. Accordingly, the runtime 452 may not be aware of the whether the application is running on the device 450 or the server 410. In some aspects, XR runtime 452 can expose the split XR API 454 to the middleware 456. The middleware 456 can also extract pose information from the runtime 452 and communicate this information with the middleware 416. So the middleware 416 on the server 410 and the middleware 456 on the device 450 can both encode or decode information or data.

In some aspects, a portion of an application or game may be running on the server 410 and a portion of the application or game can be running on the device 450. When certain information is produced on the server 410, it may be available to the runtime 452 on the device 450. Also, this information may be initially processed on the server 410 before being available to the runtime 452. Moreover, certain information produced on the device 450 may be available to the server 410 either before or after the information is processed on the device 450. For example, camera information or other information produced on the device 450 may be sent to the application running on the server 410. In some aspects, the runtime 452 may be an application or game running on the device 450. Also, the server 410 may produce information to be utilized by the runtime 452.

In some aspects, the middleware 416 can encode or decode information, e.g., information from the middleware 456. For example, middleware 416 can encode or decode camera information, application or gaming information, segment information, and/or point cloud information from the device 450. Likewise, middleware 456 can encode or decode information, e.g., information from the middleware 416. For instance, middleware 456 can encode or decode camera information, application or gaming information, segment information, and/or point cloud information from the server 410.

Also, the APIs 414 and 454 may be standardized so that interoperability can be achieved with any device. The communication interface 430 and communication interface 460 may also be standardized. As such, the same application may run on the device middleware, e.g., middleware 456, regardless of the type of middleware. In some instances, the middleware 416 and middleware 456 may not need to be standardized, e.g., middleware 416 and middleware 456 may originate from different vendors. Based on the above, the architecture 400 can help to ensure interoperability between different types of devices.

In some aspects, an application that is split XR API compliant may run on a server that has split XR API middleware and/or communicate with an HMD or device that is split XR API compliant. Similarly, a split XR API compliant device can communicate with a split XR API compliant server and access applications that are also split XR API compliant and running on that server.

Figure 5:
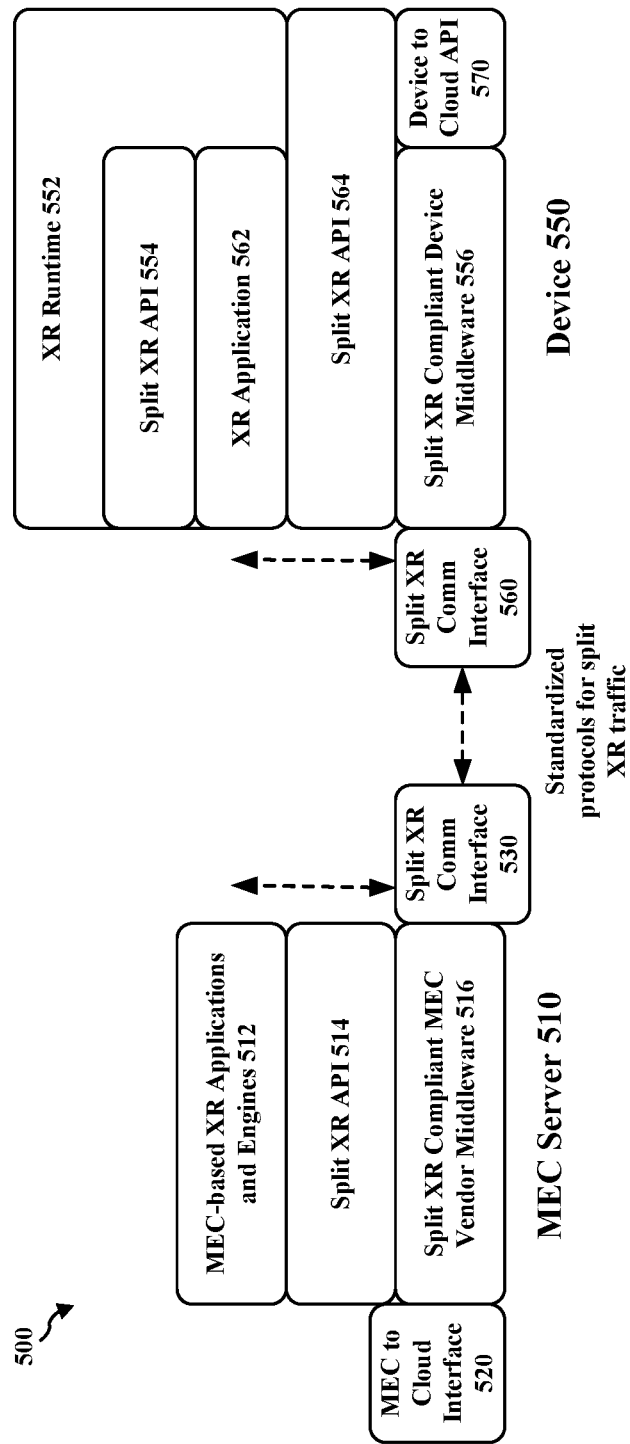
FIG. 5 illustrates an example architecture in accordance with one or more techniques of this disclosure.

FIG. 5 illustrates architecture 500 in accordance with one or more techniques of this disclosure. As shown in FIG. 5, architecture 500 is another API architecture for split XR. As further shown in FIG. 5, architecture 500 includes a device 550 and a MEC server 510. FIG. 5 also displays that standardized protocols for split XR traffic are communicated between the device 550 and the MEC server 510.

The MEC server 510 can include MEC-based XR applications and engines 512, split XR API 514, split XR compliant MEC vendor middleware 516, a split XR communication interface 530, and/or an MEC to cloud interface 520. The device can include an XR runtime 552, a split XR API 554, an XR application 562, split XR API 564, split XR compliant device middleware 556, a split XR communication interface 560, and/or device to cloud interface 570.

In some aspects, an application or game may be split between the MEC server 510 and the device 550. The application or game at the edge server may submit some textures to the runtime 552 through the split XR communication interface 530. The application on the device 550 can consume these textures, render a complementary portion, and/or submit frames to the XR runtime 552 through split XR API 554. Additionally, the runtime 552 may transmit information to the server 510 directly or this traffic may be intercepted by the on-device application. In some aspects, XR runtime 552 can expose the split XR API 564 to the middleware 556.

Figure 6:
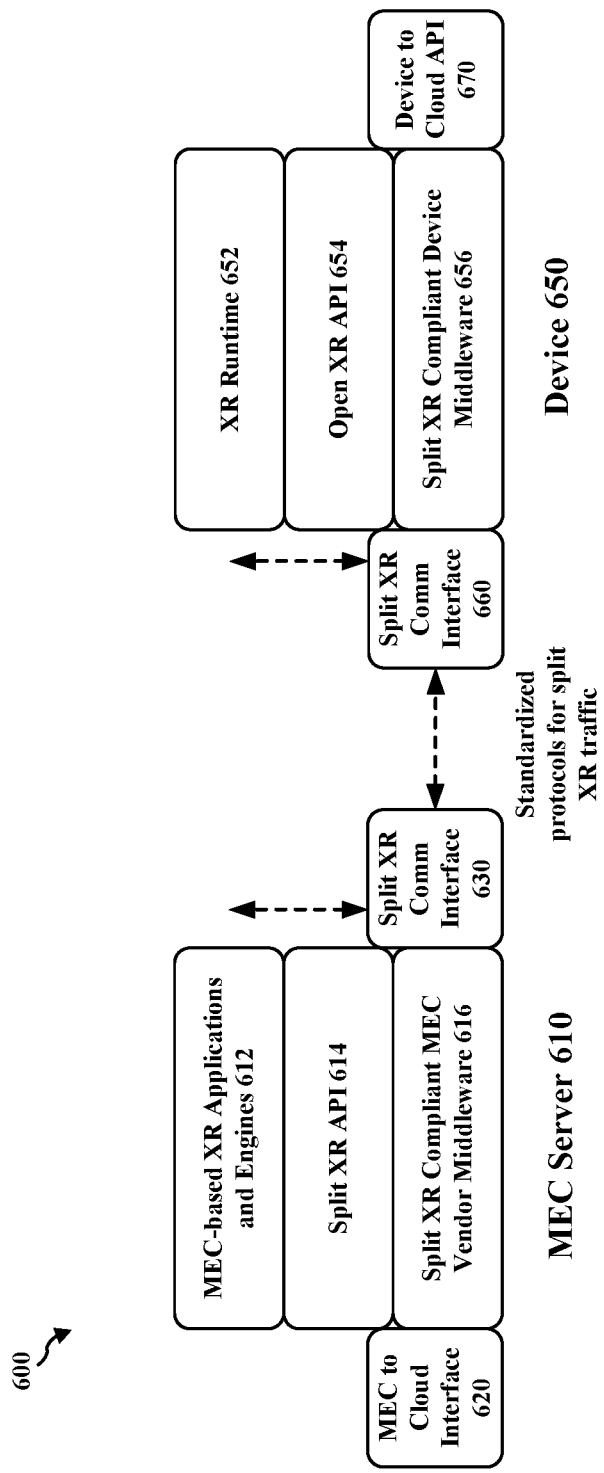
FIG. 6 illustrates an example architecture in accordance with one or more techniques of this disclosure.

FIG. 6 illustrates architecture 600 in accordance with one or more techniques of this disclosure. As shown in FIG. 6, architecture 600 integrates open XR within split XR. As further shown in FIG. 6, architecture 600 includes a device 650 and MEC server 610. FIG. 6 also displays that standardized protocols for split XR traffic are communicated between the device 650 and the MEC server 610.

The MEC server 610 can include MEC-based XR applications and engines 612, a split XR API 614, split XR compliant MEC vendor middleware 616, a split XR communication interface 630, and/or an MEC to cloud interface 620. The device 650 can include an XR runtime 652, an open XR API 654, split XR compliant device middleware 656, a split XR communication interface 660, and/or device to cloud interface 670.

In some aspects, the middleware 656 on the device 650 can receive frames from a game engine on the server 610 through the split XR communication interface 660. The middleware 656 can then submit these frames to the runtime 652 through the open XR API 654. For instance, the open XR API 654 on the device 650 can be a specialization of the split XR communication interface 660. By utilizing open XR API 654 on the device 650, aspects of the present disclosure can realize split XR applications that may be written for open XR. In some aspects, XR runtime 652 can expose the open XR API 654 to the middleware 656.

In addition, the middleware can poll or monitor for a pose through the open XR API 654 and/or transmit it as a stream to the server 610. Also, the game engine can be compliant with the split XR API 614. The game engine can also be agnostic as to whether the user device is open XR compliant. For instance, the game engine can render frames in response to a pose stream.

Figure 7:
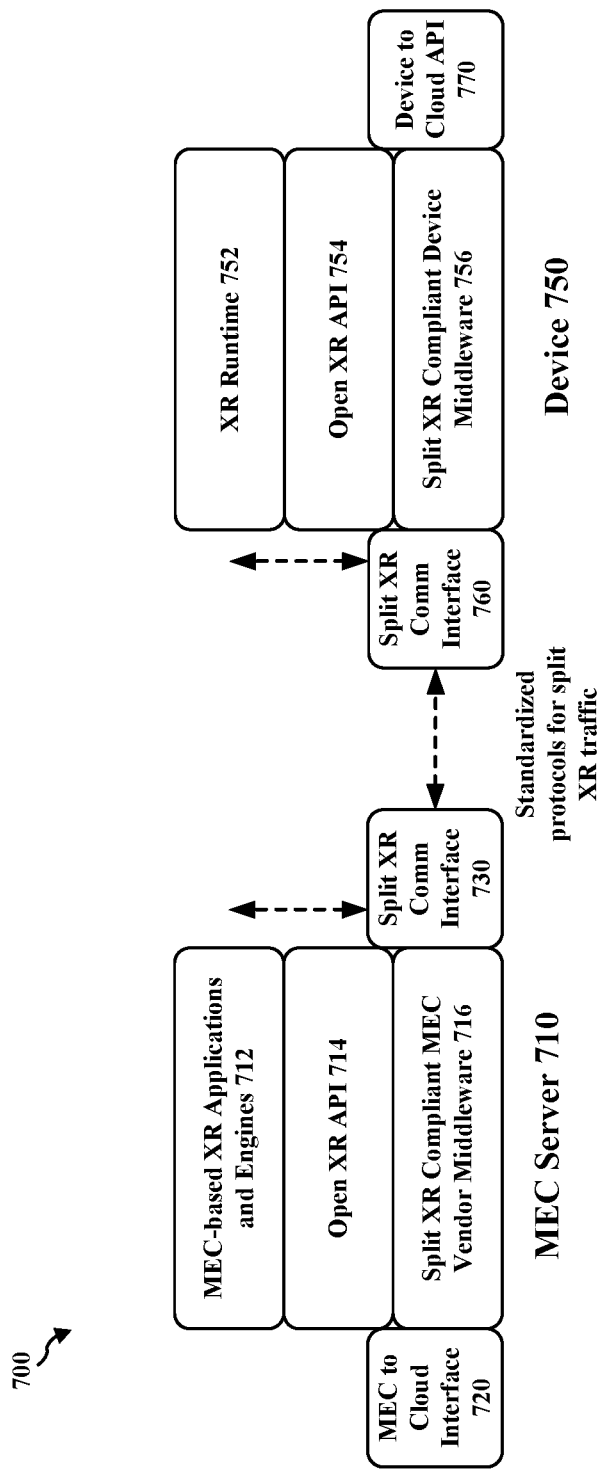
FIG. 7 illustrates an example architecture in accordance with one or more techniques of this disclosure.

FIG. 7 illustrates architecture 700 in accordance with one or more techniques of this disclosure. Similar to architecture 600 discussed above, architecture 700 can integrate open XR within split XR. As also shown in FIG. 7, architecture 700 includes a device 750 and MEC server 710. FIG. 7 also displays that standardized protocols for split XR traffic are communicated between the device 750 and the MEC server 710.

As shown in FIG. 7, the MEC server 710 can include MEC-based XR applications and engines 712, an open XR API 714, split XR compliant MEC vendor middleware 716, a split XR communication interface 730, and/or an MEC to cloud interface 720. The device 750 can include XR runtime 752, open XR API 754, split XR compliant device middleware 756, split XR communication interface 760, and/or device to cloud interface 770.

In some aspects, an application or game on the server 710 can be open XR compliant. For instance, the game or application on the server 710 can be unaware of whether it is to be deployed on the server 710 or device 750. Additionally, the game or application on the server 710 can poll or monitor for pose and controller information through the open XR interface. The game or application can then submit frames to the MEC vendor middleware 716.

In some instances, the open XR API 714 on the server 710 can be a type of split XR API. By utilizing open XR API 714 on the server 710 and/or open XR API 754 on the device 750, aspects of the present disclosure can realize split XR applications that may be written for open XR. For example, open XR API 714 and open XR API 754 can communicate via a pre-defined interface, e.g., interface 730 and interface 760. In some aspects, XR runtime 752 can expose the open XR API 754 to the middleware 756. Further, the MEC vendor middleware 716 may ensure that the game engine is agnostic to the device 750. The MEC vendor middleware 716 can also ensure that the game engine is agnostic to being deployed on the server 710.

Figure 8:
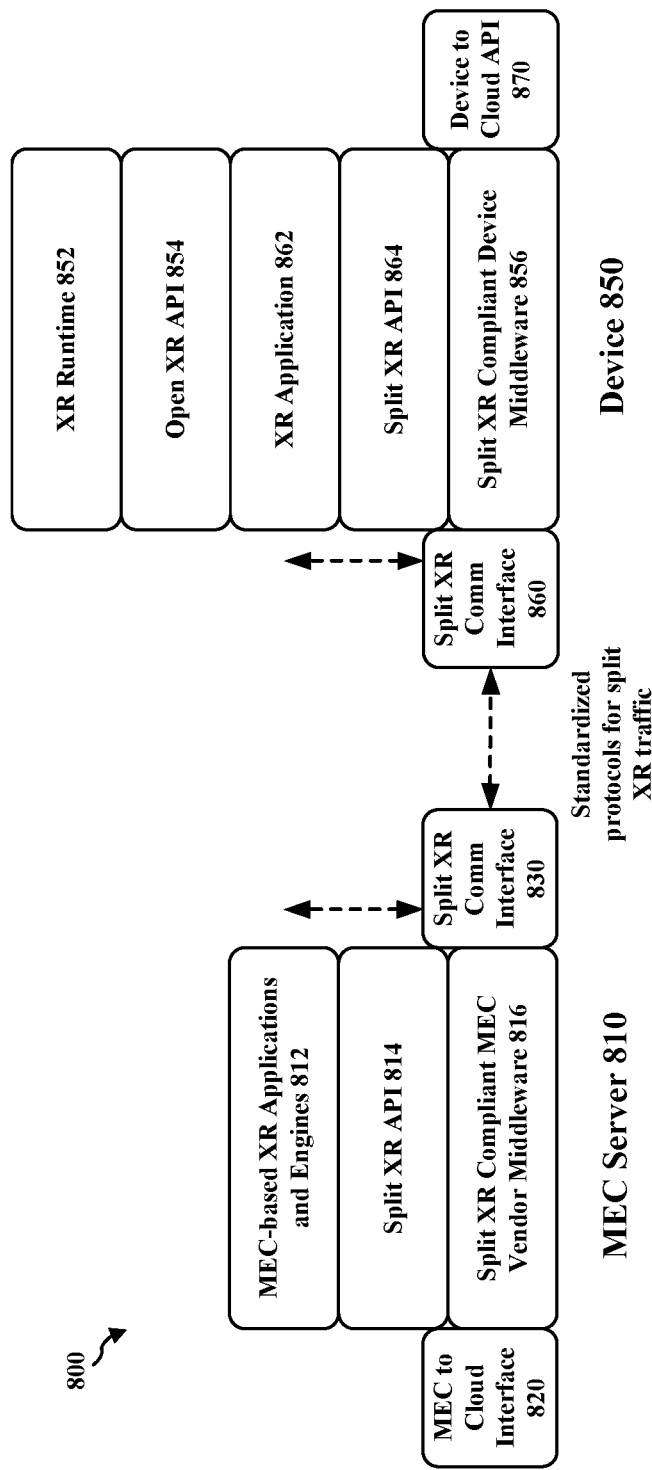
FIG. 8 illustrates an example architecture in accordance with one or more techniques of this disclosure.

FIG. 8 illustrates architecture 800 in accordance with one or more techniques of this disclosure. Similar to architectures 600 and 700 discussed above, architecture 800 can integrate open XR within split XR. As also shown in FIG. 8, architecture 800 includes a device 850 and MEC server 810. FIG. 8 also displays that standardized protocols for split XR traffic are communicated between the device 850 and the MEC server 810.

As shown in FIG. 8, the MEC server 810 can include MEC-based XR applications and engines 812, a split XR API 814, split XR compliant MEC vendor middleware 816, a split XR communication interface 830, and/or an MEC to cloud interface 820. The device 850 can include XR runtime 852, open XR API 854, XR application 862, split XR API 864, split XR compliant device middleware 856, split XR communication interface 860, and/or device to cloud interface 870.

In some aspects, a game or application may be split between the server 810 and the device 850. The application at the device 850 can be open XR compliant in submitting frames to the runtime 852 and/or polling pose information or controller events from the device 850. In some instances, XR runtime 852 can expose the open XR API 854 to the middleware 856. Additionally, the application can communicate with its counterpart on the MEC server 810 via a split XR APIs, e.g., split XR API 814 and/or split XR API 864.

FIGS. 6, 7, and 8 illustrate an example of the aforementioned processes for standardizing APIs for split rendering. As shown in FIGS. 6, 7, and 8, aspects of the present disclosure, e.g., servers and user devices herein, can perform a number of different steps or processes to standardize APIs for split rendering. For instance, servers and user devices herein can determine at least one split API, e.g., API 814 and API 864, for a user device, e.g., device 850, and a server, e.g., server 810. In some aspects, the at least one split API, e.g., API 814 and API 864, can be at least one split extended reality (XR) API, e.g., split XR API 814 and split XR API 864.

Further, servers and user devices herein can establish a communication interface, e.g., interface 830 and interface 860, between the user device, e.g., device 850, and the server, e.g., server 810, based on the at least one split API, e.g., API 814 and API 864. The apparatus can also implement the at least one split API, e.g., API 714 and API 764, on at least one of the user device, e.g., device 750, or the server, e.g., server 710. In some aspects, the at least one split API implemented on at least one of the user device, e.g., device 750, or the server, e.g., server 710, can be at least one open XR API, e.g., open XR API 714 and open XR API 764. The apparatus can also divide at least one application workload between the user device, e.g., device 750, and the server, e.g., server 710, based on the at least one split API, e.g., open XR API 714 and open XR API 764.

Moreover, the apparatus can encode or decode application information at the user device or the server, e.g., via middleware 816 or middleware 856. In some aspects, the encoded or decoded application information may allow the user device and the server to communicate with one another, e.g., via interface 830 and interface 860. Also, the application information may be encoded or decoded at the user device or the server based on middleware, e.g., middleware 816 or middleware 856.

In some instances, the user device may include device middleware, e.g., device middleware 856, and the server may include server middleware, e.g., MEC vendor middleware 816. Further, the user device may include an XR runtime application, e.g., XR runtime 852, based on the device middleware, e.g., device middleware 856, and the split API, e.g., split XR API 864. In some aspects, the application information may include at least one of camera information, gaming information, segment information, or point cloud information, e.g., application information encoded at middleware 856 or middleware 816. Also, the server may include at least one server application, e.g., applications and engines 812, based on the application information.

Additionally, the apparatus can communicate between the user device and the server based on the communication interface and the at least one split API, e.g., interface 830 and interface 860 may communicate information. In some aspects, the user device may include a device communication interface, e.g., communication interface 860, and the server may include a server communication interface, e.g., communication interface 830. Also, the user device and the server may communicate via the device communication interface, e.g., communication interface 860, and the server communication interface, e.g., communication interface 860.

Figure 9:
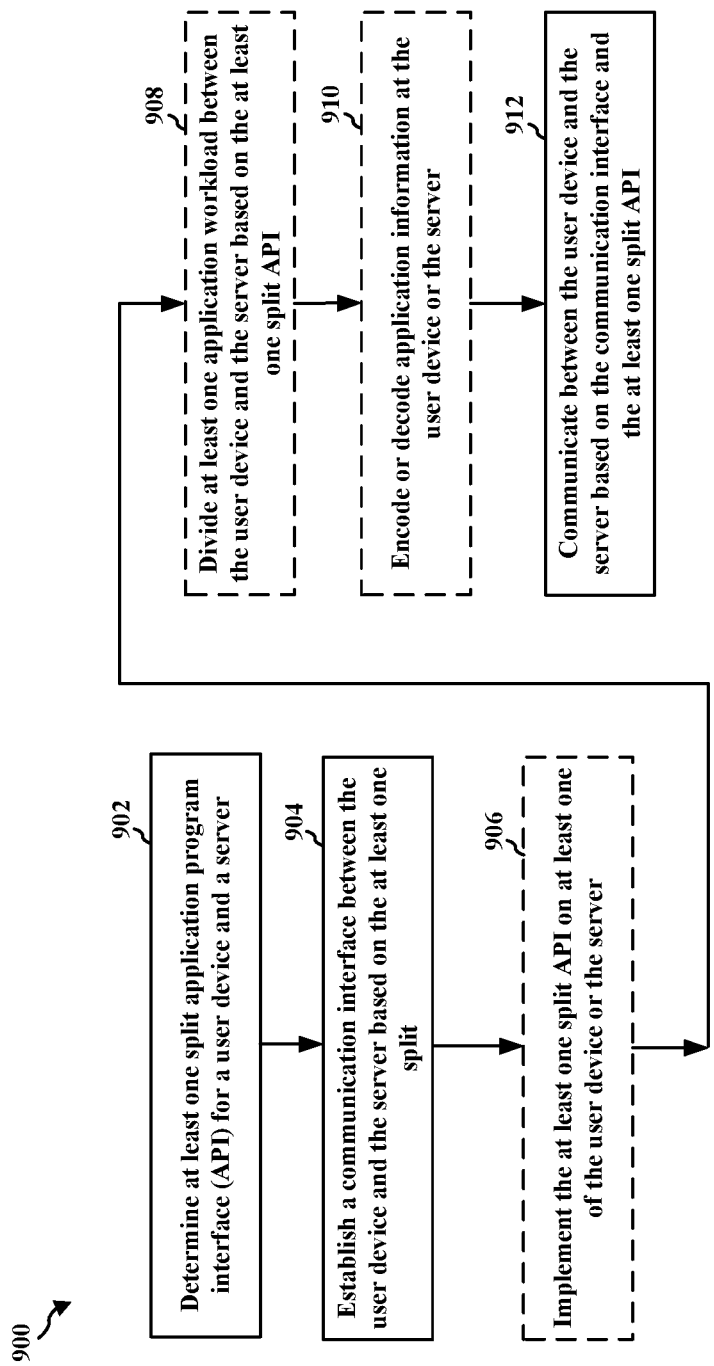
FIG. 9 illustrates an example flowchart of an example method in accordance with one or more techniques of this disclosure.

FIG. 9 illustrates a flowchart 900 of an example method in accordance with one or more techniques of this disclosure. The method may be performed by an apparatus such as a user device, a server, a CPU, a GPU, or any apparatus that can perform graphics processing. At 902, the apparatus may determine at least one split API for a user device and a server, as described in connection with the examples in FIGS. 3, 4, 5, 6, 7, and 8. In some aspects, the at least one split API can be at least one split extended reality (XR) API, as described in connection with the examples in FIGS. 3, 4, 5, 6, 7, and 8.

At 904, the apparatus may establish a communication interface between the user device and the server based on the at least one split API, as described in connection with the examples in FIGS. 3, 4, 5, 6, 7, and 8. At 906, the apparatus may also implement the at least one split API on at least one of the user device or the server, as described in connection with the examples in FIGS. 3, 4, 5, 6, 7, and 8.

In some aspects, the at least one split API implemented on at least one of the user device or the server can be at least one open XR API, as described in connection with the examples in FIGS. 3, 4, 5, 6, 7, and 8. At 908, the apparatus may divide at least one application workload between the user device and the server based on the at least one split API, as described in connection with the examples in FIGS. 3, 4, 5, 6, 7, and 8.

At 910, the apparatus may encode or decode application information at the user device or the server, as described in connection with the examples in FIGS. 3, 4, 5, 6, 7, and 8. In some aspects, the encoded or decoded application information may allow the user device and the server to communicate with one another, as described in connection with the examples in FIGS. 3, 4, 5, 6, 7, and 8. Also, the application information may be encoded or decoded at the user device or the server based on middleware, as described in connection with the examples in FIGS. 3, 4, 5, 6, 7, and 8.

In some aspects, the user device may include device middleware and the server may include server middleware, as described in connection with the examples in FIGS. 3, 4, 5, 6, 7, and 8. Further, the user device may include an XR runtime application based on the device middleware and the split API, as described in connection with the examples in FIGS. 3, 4, 5, 6, 7, and 8. In some aspects, the application information may include at least one of camera information, gaming information, segment information, or point cloud information, as described in connection with the examples in FIGS. 3, 4, 5, 6, 7, and 8. Also, the server may include at least one server application based on the application information, as described in connection with the examples in FIGS. 3, 4, 5, 6, 7, and 8.

At 912, the apparatus may communicate between the user device and the server based on the communication interface and the at least one split API, as described in connection with the examples in FIGS. 3, 4, 5, 6, 7, and 8. In some aspects, the user device may include a device communication interface and the server may include a server communication interface, as described in connection with the examples in FIGS. 3, 4, 5, 6, 7, and 8. Also, the user device and the server may communicate via the device communication interface and the server communication interface, as described in connection with the examples in FIGS. 3, 4, 5, 6, 7, and 8.

In one configuration, a method or apparatus for graphics processing is provided. The apparatus may be a user device, a server, a CPU, a GPU, or some other processor that can perform graphics processing. In one aspect, the apparatus may be the processing unit 120 within the device 104, or may be some other hardware within device 104 or another device. The apparatus may include means for determining at least one split application program interface (API) for a user device and a server. The apparatus may also include means for establishing a communication interface between the user device and the server based on the at least one split API. The apparatus may also include means for communicating between the user device and the server based on the communication interface and the at least one split API. The apparatus may also include means for implementing the at least one split API on at least one of the user device or the server. The apparatus may also include means for dividing at least one application workload between the user device and the server based on the at least one split API. The apparatus may also include means for encoding or decoding application information at the user device or the server.

The subject matter described herein can be implemented to realize one or more benefits or advantages. For instance, the described graphics processing techniques can be used by a user device, a server, a GPU, a CPU, or some other processor that can perform graphics processing to implement the standardized API techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize standardized APIs to improve performance during the split rendering process.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing configured for split rendering, comprising:
    determining at least one split application program interface (API) for a user device and a server;
    establishing a communication interface between the user device and the server based on the at least one split API;
    implementing the at least one split API on the user device and the server, wherein the at least one split API implemented on the user device and the server is at least one extended reality (XR) API;
    dividing at least one application workload between the user device and the server based on the at least one split API, wherein the user device is associated with a first portion of the at least one application workload and the server is associated with a second portion of the at least one application workload, wherein the first portion of the at least one application workload corresponds to camera information and the second portion of the at least one application workload corresponds to object recognition; and
    communicating between the user device and the server based on the communication interface and the at least one split API, wherein the user device includes device middleware and the server includes server middleware, wherein application information is decoded at the user device based on the device middleware, wherein pose information is extracted at the device middleware, and wherein the pose information is communicated from the device middleware to the server middleware.

2. The method of claim 1, wherein the at least one split API is at least one split extended reality (XR) API.

3. The method of claim 1, further comprising:
    encoding the application information at or the server.

4. The method of claim 3, wherein the encoded application information allows the user device and the server to communicate with one another.

5. The method of claim 3, wherein the application information is encoded at the server based on the server middleware.

6. The method of claim 3, wherein the application information includes at least one of the camera information, gaming information, segment information, or point cloud information.

7. The method of claim 3, wherein the server includes at least one server application based on the application information.

8. The method of claim 1, wherein the user device includes an XR runtime application based on the device middleware and the at least one split API.

9. The method of claim 1, wherein the user device includes a device communication interface and the server includes a server communication interface.

10. The method of claim 9, wherein the user device and the server communicate via the device communication interface and the server communication interface.

11. An apparatus for graphics processing configured for split rendering, comprising:
    a memory; and
    at least one processor coupled to the memory and configured to:
        determine at least one split application program interface (API) for a user device and a server;
        establish a communication interface between the user device and the server based on the at least one split API;
        implement the at least one split API on the user device and the server, wherein the at least one split API implemented on the user device and the server is at least one extended reality (XR) API;
        divide at least one application workload between the user device and the server based on the at least one split API, wherein the user device is associated with a first portion of the at least one application workload and the server is associated with a second portion of the at least one application workload, wherein the first portion of the at least one application workload corresponds to camera information and the second portion of the at least one application workload corresponds to object recognition; and
        communicate between the user device and the server based on the communication interface and the at least one split API, wherein the user device includes device middleware and the server includes server middleware, wherein application information is decoded at the user device based on the device middleware, wherein pose information is extracted at the device middleware, and wherein the pose information is communicated from the device middleware to the server middleware.

12. The apparatus of claim 11, wherein the at least one split API is at least one split extended reality (XR) API.

13. The apparatus of claim 11, wherein the at least one processor is further configured to:
encode the application information at the server.

14. The apparatus of claim 13, wherein the encoded application information allows the user device and the server to communicate with one another.

15. The apparatus of claim 13, wherein the application information is encoded at the server based on the server middleware.

16. The apparatus of claim 13, wherein the application information includes at least one of the camera information, gaming information, segment information, or point cloud information.

17. The apparatus of claim 13, wherein the server includes at least one server application based on the application information.

18. The apparatus of claim 11, wherein the user device includes an XR runtime application based on the device middleware and the at least one split API.

19. The apparatus of claim 11, wherein the user device includes a device communication interface and the server includes a server communication interface.

20. The apparatus of claim 19, wherein the user device and the server communicate via the device communication interface and the server communication interface.

21. An apparatus for graphics processing configured for split rendering, comprising:
means for determining at least one split application program interface (API) for a user device and a server;
means for establishing a communication interface between the user device and the server based on the at least one split API;
means for implementing the at least one split API on the user device and the server, wherein the at least one split API implemented on the user device and the server is at least one extended reality (XR) API;
means for dividing at least one application workload between the user device and the server based on the at least one split API, wherein the user device is associated with a first portion of the at least one application workload and the server is associated with a second portion of the at least one application workload, wherein the first portion of the at least one application workload corresponds to camera information and the second portion of the at least one application workload corresponds to object recognition; and
means for communicating between the user device and the server based on the communication interface and the at least one split API, wherein the user device includes device middleware and the server includes server middleware, wherein application information is decoded at the user device based on the device middleware, wherein pose information is extracted at the device middleware, and wherein the pose information is communicated from the device middleware to the server middleware.

22. The apparatus of claim 21, wherein the at least one split API is at least one split extended reality (XR) API.

23. The apparatus of claim 21, further comprising:
means for encoding the application information at the server.

24. The apparatus of claim 23, wherein the encoded application information allows the user device and the server to communicate with one another.

25. The apparatus of claim 23, wherein the application information is encoded at the server based on the server middleware.

26. The apparatus of claim 23, wherein the application information includes at least one of the camera information, gaming information, segment information, or point cloud information.

27. The apparatus of claim 23, wherein the server includes at least one server application based on the application information.

28. The apparatus of claim 21, wherein the user device includes an XR runtime application based on the device middleware and the at least one split API.

29. The apparatus of claim 21, wherein the user device includes a device communication interface and the server includes a server communication interface.

30. The apparatus of claim 29, wherein the user device and the server communicate via the device communication interface and the server communication interface.

31. A non-transitory computer-readable medium storing computer executable code for graphics processing configured for split rendering, the code when executed by a processor causes the processor to:
determine at least one split application program interface (API) for a user device and a server;
establish a communication interface between the user device and the server based on the at least one split API;
implement the at least one split API on the user device and the server, wherein the at least one split API implemented on the user device and the server is at least one extended reality (XR) API;
divide at least one application workload between the user device and the server based on the at least one split API, wherein the user device is associated with a first portion of the at least one application workload and the server is associated with a second portion of the at least one application workload, wherein the first portion of the at least one application workload corresponds to camera information and the second portion of the at least one application workload corresponds to object recognition; and
communicate between the user device and the server based on the communication interface and the at least one split API, wherein the user device includes device middleware and the server includes server middleware, wherein application information is decoded at the user device based on the device middleware, wherein pose information is extracted at the device middleware, and wherein the pose information is communicated from the device middleware to the server middleware.

* * * * *